United States Patent [19]

Higaki

[11] 4,226,296
[45] Oct. 7, 1980

[54] FRAME OF MOTORCYCLES
[75] Inventor: Kazuo Higaki, Iwata, Japan
[73] Assignee: Yamaha Hatsudoki Kabushiki Kaisha, Iwata, Japan
[21] Appl. No.: 945,297
[22] Filed: Sep. 25, 1978
[30] Foreign Application Priority Data
Sep. 30, 1977 [JP] Japan .................. 52/118061
[51] Int. Cl.² .................... B62D 61/02
[52] U.S. Cl. .................... 180/219; 280/281 R
[58] Field of Search ......... 280/281 R, 281 LP, 281 B; 180/33 R, 33 A, 33 B, 33 C, 33 D, 33 E, 34, 35, 29, 32, 219

[56] References Cited
U.S. PATENT DOCUMENTS

| | | | |
|---|---|---|---|
| 3,193,039 | 7/1965 | Sutton | 180/33 R |
| 3,945,463 | 3/1976 | Okano | 180/35 |
| 4,011,921 | 3/1977 | Sakamoto | 180/33 R |

FOREIGN PATENT DOCUMENTS

| | | | |
|---|---|---|---|
| 760046 | 2/1934 | France | 280/281 R |
| 664667 | 1/1952 | United Kingdom | 280/281 R |

Primary Examiner—John J. Love
Assistant Examiner—Randall A. Schrecengost
Attorney, Agent, or Firm—Donald D. Mon

[57] ABSTRACT

A motorcycle frame has a steering head to which a pair of upper and a pair of lower tubes are welded. The tubes extend rearwardly, the members of each pair being spaced apart from one another. They are interconnected at the rear. The lower tubes are spaced apart to receive and suspend a motorcycle engine, the engine being insertable into and removable from, said frame through the bottom of the frame. Conveniently, seat rails can be attached to the frame.

9 Claims, 5 Drawing Figures

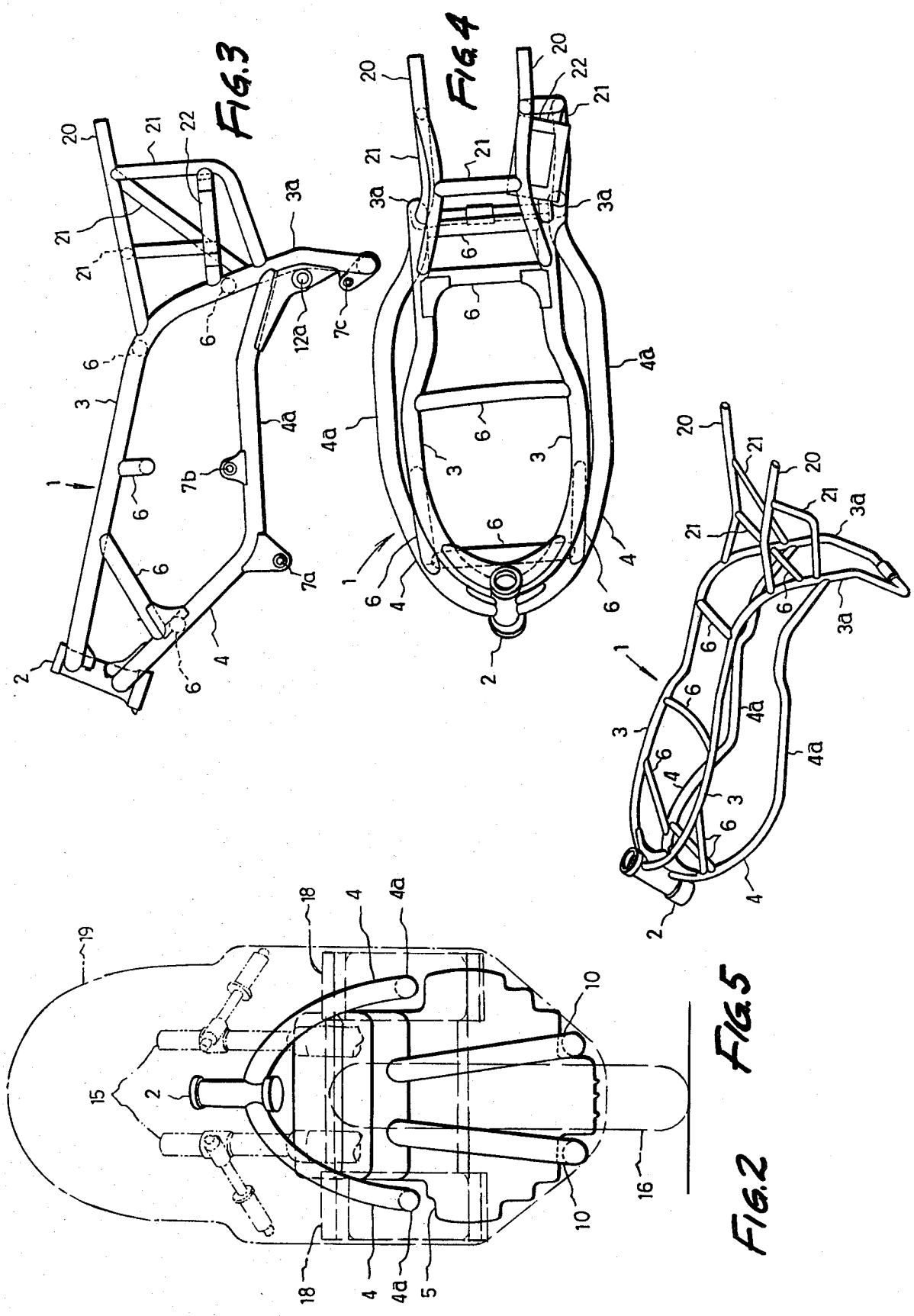

FRAME OF MOTORCYCLES

The present invention relates to a frame for motorcycles, which has a high rigidity and which permits easy loading and unloading of an engine.

A frame for motorcycles which is made of steel pipes has a higher rigidity than a frame made of steel plates and is suitable for large and heavy vehicles. Such frames are known. Frames made of steel pipes include cradle types and diamond types. A cradle type frame has down tubes which are extended around the lower surface of the engine thereby to support the same at the lower portion thereof. A diamond type frame also has down tubes which are cut at the intermediate portions thereof to be connected to the engine so that the engine constitutes a part of the frame.

However, it is difficult to load on and unload from a cradle type frame an engine which is to be placed on the down tubes thereof. It is also difficult to mount a large engine on a diamond type frame due to the insufficient rigidity thereof.

An object of the present invention is to eliminate the above-mentioned drawbacks encountered in conventional frames.

A frame according to this invention has increased rigidity, and comprises a pair of upper tubes the rear portions of which are downwardly bent, a pair of lower tubes which are disposed below the upper tubes and which are extended near the side surfaces of an engine with the rear ends thereof welded to the downwardly bent portions of the upper tubes, and connector pipes disposed between suitable portions of the upper and lower tubes to be welded thereto, the frame thereby permitting suspendingly connecting the engine between the lower tubes so that the engine can easily be loaded on and unloaded from the frame.

The presently preferred embodiment of the present invention will be described in detail with reference to the accompanying drawings, in which:

FIG. 2 is a partial front elevational view of the motorcycle shown in FIG. 1;

FIGS. 3 and 4 are a side elevational view and a plan view, respectively, of the frame shown in FIG. 1; and FIG. 5 is a perspective view of the frame shown in FIG. 1.

Figure 1:
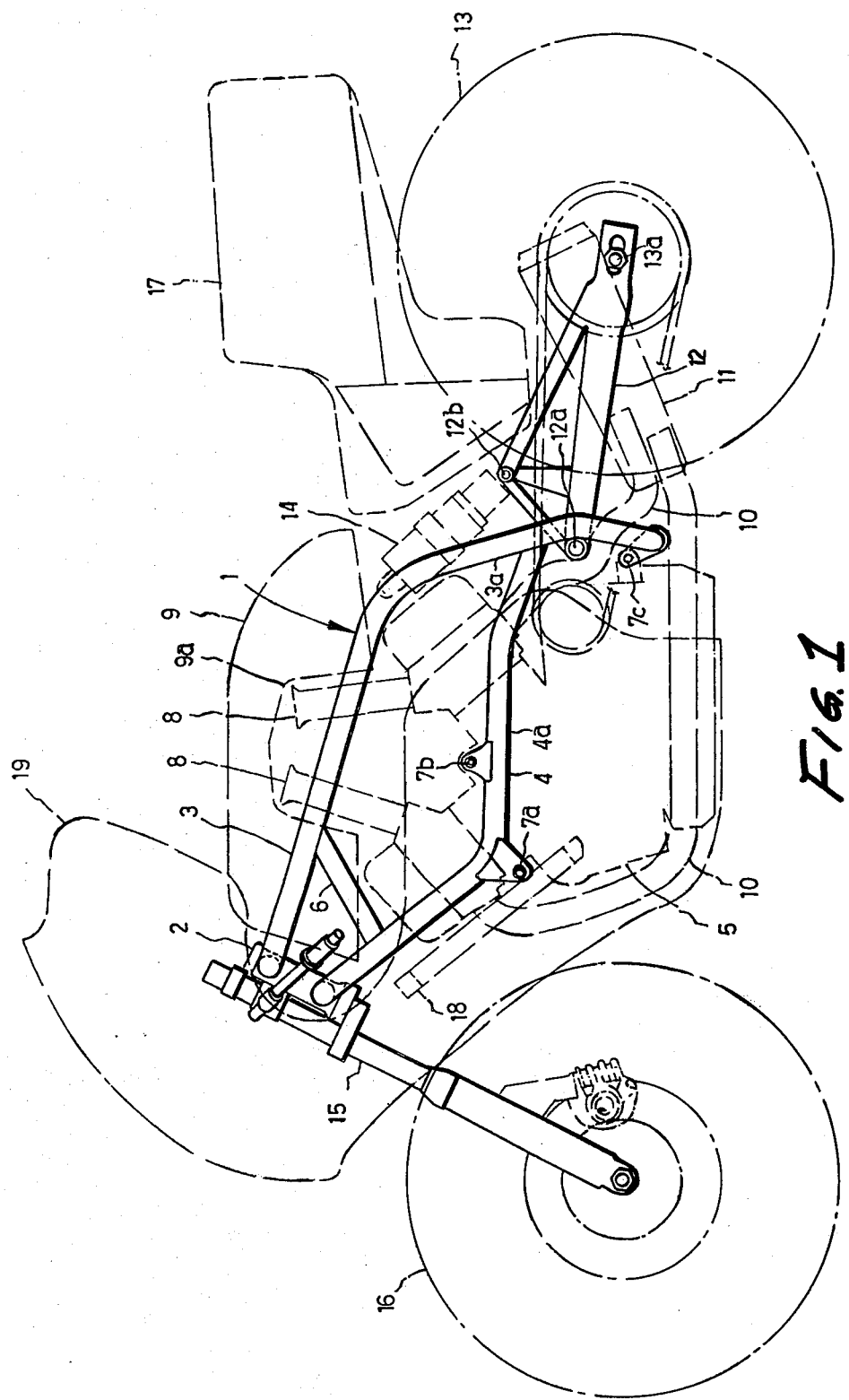
FIG. 1 is a side elevational view of a racing motorcycle.

Referring to the drawings, a frame 1 comprises a steering head 2, a pair of upper tubes 3 and a pair of lower tubes 4. As may be noted from FIGS. 3 and 4, the upper tubes 3 consist of right and left members, the front ends of which are welded to the steering head 2, the rear portion being aslant downwardly and bent to form bent portions 3a.

Lower tubes 4 consist of right and left members disposed below the upper tubes. The front ends of the lower tubes 4 are welded to steering head 2. The intermediate portions 4a are extended near the side surfaces of an engine 5 (FIGS. 1 and 2), and the rear ends are welded to the bent portions 3a of the upper tubes 3. The rearmost portions of the upper tubes 3 or the lower end sections of the bent portions 3a are inwardly bent toward each other and welded to each other. To suitable portions of the upper and lower tubes 3, 4, connector pipes 6 are welded to additionally increase the rigidity of the frame.

The engine 5 is of a 4-cylinder, 4-stroke cycle, water-cooled V-type, which is suspended (as may be clearly noted from FIG. 1) from brackets 7a, 7b provided on the intermediate portions of the lower tubes 4 and brackets 7c provided on the rear end sections of the bent portions 3a. Projecting side portions of the engine 5 for housing a clutch and a generator therein are below the lower tubes 4. Consequently, the engine 5 can be withdrawn under the frame 1 after it has been detached from the brackets 7a, 7b, 7c.

Engine 5 is of an electronically fuel-injecting type having four cylindrical air suction funnels 8 upwardly projecting from the inside surfaces of cylinder heads which are in the form of a letter "V". These four air funnels 8 are opposed to the surface of recessed portion 9a provided in the almost-central portion of the lower surface of a fuel tank 9.

Reference numeral 10 denotes exhaust pipes of the engine. The exhaust pipes 10 for two front cylinders pass the front and lower surfaces of the engine 5 to be extended rearwardly. The exhaust pipes 10 for two rear cylinders are passed between the bent portions 3a of the upper tubes 3 and extended rearwardly. All of these exhaust pipes 10 are gathered under rear arms 12, which will be described later, and are fitted into a muffler 11. Thus, the exhaust pipes 10 can be compactly disposed to lend beauty to the motorcycle.

Reference numeral 12 denotes triangular rear arms consisting of right and left members integrally formed so as to hold a rear wheel 13 therebetween. The front ends of the rear arms 12 are supported on the bent portions 3a of the upper tubes 3 at fulcrums 12a, and the rear ends thereof are supported on a shaft 13a of the rear wheel 13. Between vertexes 12b of the triangle formed by the rear arms 12 and the upper tubes 3, shock absorbers 14 are provided so as to allow the rear wheel 13 to be elastically moved in the vertical direction about the fulcrums 12a.

Reference numeral 15 denotes a front fork for holding a front wheel 16. The front fork 15 is rotatably supported on the steering head 2. Reference numeral 17 denotes a seat, 18 a radiator consisting of right and left members, and 19 a windshield.

Frame 1 also includes a pair of seat rails 20 as shown in FIGS. 3-5, which are rearwardly extended from the intermediate portions of the upper tubes 3 and which are reinforced with pipes 21. On the left-hand pipe 21 (FIG. 4), a rack 22 is fixed on which batteries are to be placed.

Since the frame for motorcycles according to the present invention, which is of the above-described construction, has a pair of upper tubes the rear portions of which are aslant downwardly bent to form bent portions; and a pair of lower tubes disposed below the upper tubes, passing the side surfaces of the engine, and welded at the rear ends thereof to the bent portions of the upper tubes, to allow the engine to be suspended between the lower tubes, the loading and unloading of the engine can be conducted very easily. The lower tubes passing the side surfaces of the engine are greatly distant from each other in the direction of the width of the motorcycle providing for significant resistance to a torsional force exerted on the frame, exerted by pressure on the steering head from the front wheel and the fulcrums at which the rear arms are supported on the upper arms.

In addition, the lower tubes of the frame according to the present invention are shorter than the down tubes of a conventional cradle type frame. This contributes to the reduction of weight of the frame.

This invention is not to be limited by the embodiments shown in the drawings and described in the description which are given by way of example and not of limitation but only in accordance with the scope of the appended claims.

I claim:

1. A motorcycle frame for dependently supporting an engine, comprising: a forward steering head; a pair of laterally spaced-apart upper tubes; a pair of laterally spaced-apart lower tubes, the forward end of each of the tubes being welded to the steering head, the rearward ends of the upper tubes, the lower tubes being welded to the upper tubes at locations spaced forwardly from the rearward ends of the rear portions of the upper tubes being downwardly bent, the intermediate portions of the lower tubes being laterally spaced-apart sufficiently to receive and embrace said engine; at least one upper connector tube laterally interconnecting said upper tubes; at least one lower connector tube laterally interconnecting said lower tubes, the frame being devoid of structure which can interfere with the entry of said engine between said intermediate portions; and bracket means on said frame for dependently suspending said engine between said intermediate portions.

2. A motorcycle frame according to claim 1 in which a plurality of said bracket means is attached to each of said lower tubes.

3. A motorcycle frame according to claim 2 in which a bracket means is attached to each of said upper tubes, adjacent to the respective rear end thereof.

4. A motorcycle frame according to claim 1 in which a plurality of seat rails for supporting a seat are attached to and extend between said upper tubes forwardly of the said rear portions thereof.

5. In combination: a motorcycle frame according to claim 1; and an internal combustion engine suspended from said frame and projecting downwardly between said lower tubes, said lower tubes providing lateral clearance for all parts of the engine which have an elevation above the lower tubes when said engine is suspended as stated.

6. A combination according to claim 5 in which a plurality of bracket means is attached to each of said lower tubes for attachment of said engine to the frame.

7. A combination according to claim 6 in which a bracket means is attached to each of said upper tubes, adjacent to the respective rear end thereof, for additional attachment of said engine.

8. A combination according to claim 5 in which said lower tubes are connected to each other at their rearward ends, and are spaced-apart from each other adjacent thereto to provide an opening, and in which the engine has a plurality of exhaust pipes and a muffler, said exhaust pipes being connected to said muffler, and said mufflers passing through said opening.

9. A combination according to claim 5 in which said engine has an even number of cylinders, disposed in banks forming the shape of a letter V, said frame including bracket means attached to each of said lower tubes by means of which said engine is attached to and suspended from said lower tubes at an engine portion near the intersecting portions of said banks.

* * * * *